(12) United States Patent
Takemura et al.

(10) Patent No.: US 6,396,798 B1
(45) Date of Patent: May 28, 2002

(54) OPTICAL DISC WITH A REWRITABLE AREA AND A READ-ONLY AREA

(75) Inventors: Yoshinari Takemura, Settsu; Shunji Ohara, Higashiosaka; Takashi Ishida, Yawata; Isao Satoh, Neyagawa; Kazuhiko Nakane, Tokyo; Masato Nagasawa, Tokyo; Yoshinobu Ishida, Tokyo, all of (JP)

(73) Assignees: Matsushita Electric Industrial Co., Ltd., Osaka; Mitsubishi Denki Kabushiki Kaisha, Tokyo, both of (JP)

(*) Notice: Subject to any disclaimer, the term of this patent is extended or adjusted under 35 U.S.C. 154(b) by 0 days.

(21) Appl. No.: 09/277,609

(22) Filed: Mar. 29, 1999

Related U.S. Application Data

(62) Division of application No. 08/883,445, filed on Jun. 26, 1997, now Pat. No. 5,923,640.

(30) Foreign Application Priority Data

Jun. 26, 1996 (JP) .............................. 8-166184
Jun. 26, 1996 (JP) .............................. 8-166194

(51) Int. Cl.$^7$ ................................. G11B 7/24
(52) U.S. Cl. .................. 369/275.3; 369/275.4
(58) Field of Search ................ 369/275.3, 275.4, 369/275.1, 44.13, 124, 54, 116, 44.26, 44.37, 13, 278, 32, 275.2, 53.2, 53.28, 53.4, 277

(56) References Cited

U.S. PATENT DOCUMENTS

| | | | |
|---|---|---|---|
| 4,707,816 A | 11/1987 | Yonezawa et al. | 369/44.13 |
| 4,748,609 A | 5/1988 | Yonezawa et al. | 369/44.13 |
| 5,199,022 A * | 3/1993 | Suzuki et al. | 369/275.1 |
| 5,214,627 A * | 5/1993 | Nakashima et al. | 369/32 |
| 5,402,411 A * | 3/1995 | Maeda et al. | 369/44.26 |
| 5,422,874 A * | 6/1995 | Birukawa et al. | 369/275.2 |
| 5,452,284 A | 9/1995 | Miyagawa et al. | 369/129 |
| 5,493,552 A * | 2/1996 | Kobori | 369/109 |
| 5,508,995 A | 4/1996 | Moriya et al. | 369/275.4 |
| 5,566,141 A * | 10/1996 | Yamaguchi et al. | 369/32 |
| 5,616,390 A | 4/1997 | Miyagawa et al. | 428/64.1 |
| 5,796,712 A * | 8/1998 | Moribe et al. | 369/275.4 |
| 5,831,964 A * | 11/1998 | Tanaka | 369/275.3 |
| 5,838,658 A * | 11/1998 | Nakane et al. | 369/275.4 |
| 5,933,410 A * | 8/1999 | Nakane et al. | 369/275.3 |
| 6,055,218 A * | 4/2000 | Takeda et al. | 369/44.28 |

FOREIGN PATENT DOCUMENTS

| | | |
|---|---|---|
| EP | 0768648 A | 4/1997 |
| JP | 57050330 A | 3/1982 |
| JP | 04038633 A | 2/1992 |
| JP | 6176404 | 6/1994 |
| JP | 06274896 A | 9/1994 |
| JP | 06290465 A | 10/1994 |
| JP | 07057302 A | 3/1995 |
| JP | 07110944 A | 4/1995 |
| JP | 746430 | 5/1995 |
| JP | 08022621 A | 1/1996 |
| JP | 8022640 A | 1/1996 |

OTHER PUBLICATIONS

The Japan Society of Applied Physics, "Japanese Journal of Applied Physics", Part 1, Nov. 1993, vol. 32, No. 11B.
Masatoshi Ohtake et al., "Composite Wobbled Tracking in the Optical Disk System", Dec. 12–13, 1985.

* cited by examiner

*Primary Examiner*—Ali Neyzari

(57) ABSTRACT

An optical disc having both rewritable area and read-only area is disclosed. The rewritable area has a single spiral pattern of start track land at a leading edge, and a single spiral pattern of end track land at a trailing edge, whereby portions of the physical address area PID deviated approximately Pa/2 from the track of the rewritable area are being intruded into the start track land and the end track land.

10 Claims, 11 Drawing Sheets

OPTICAL DISC WITH A REWRITABLE AREA AND A READ-ONLY AREA

This application is a division of application Ser. No. 08/883,445 filed Jun. 26, 1997, now U.S. Pat. No. 5,923,640.

BACKGROUND OF THE INVENTION

1. Field of the Invention

The present invention relates to an optical disc having an area that is recordable and reproducible (the "rewritable area" below), and an area that is only reproducible (the "read-only area" below).

2. Description of the Prior Art

The problem that arises when there are both rewritable and read-only areas on an optical disc is how the boundary between the rewritable area and the read-only area is determined. If the two areas are too close at the boundary therebetween, mixing of data from the two area may occur; if the areas are too separated, the efficiency of using the optical disc may deteriorate.

SUMMARY OF THE INVENTION

The object of the present invention is therefore to resolve the above problem and provide a new optical disc whereby positioning conditions for the border area between a rewritable area and read-only area are defined so that mixing data from both areas does not occur, and the rewritable area and read-only area are positioned substantially adjacent, or via a land having a predetermined width, so that the efficiency of using the optical disc does not deteriorate.

To achieve the above objects, an optical disc according to the first aspect of the invention comprises:

a rewritable area having a single spiral recording track formed by forming a groove and a land circumferentially on a disc substrate with the groove and land alternating and the recording track of a groove corresponding to one circumference of the disc and the recording track of the land corresponding to one circumference of the disc connecting alternately to each other at a particular radial transition line, and the track pitch Pa of the recording tracks is a value less than $\lambda/NA$, said rewritable area having a first data recording area for recording data by marks formed thereon by a local physical change effected in a recording film by a laser beam of wavelength $\lambda$ using a lens of a specific aperture NA, and a read-only area having a second data recording area to which particular information is prerecorded by forming a series of pits on the optical disc to a spiral recording track of a track pitch Pb substantially equal to the track pitch Pa of the spiral recording track in the rewritable area, said rewritable area comprising recording sectors each of which comprises a first header area preformatted with embossed pits expressing an address information, and a first data recording area for recording data, said first header area comprising a physical address area PID comprising at least an address area Pid for storing sector address information, said physical address area PID being repeated 2K (K being a positive integer) times, wherein when the 2K physical address areas PID are labelled in sequence from the first $PID_1, \ldots, PID_K$, $PID_{K+1}, \ldots,$ and $PID_{2K}$, the first half $PID_1, \ldots, PID_K$ are deviated in a first radial direction of the disc approximately Pa/2 from the track of the groove recording sector, and the second half $PID_{K+1}, \ldots, PID_{2K}$ are deviated in a second radial direction of the disc approximately Pa/2 from the track of the groove recording sector, said rewritable area comprising a single spiral pattern of start track land at a leading edge, and a single spiral pattern of end track land at a trailing edge, whereby portions of the physical address area PID deviated approximately Pa/2 from the track of the rewritable area are being intruded into the start track land and the end track land.

By the first aspect of the invention, the border between a rewritable area and read-only area in an optical disc always comprises a start track land or a end track land on the rewritable area side adjacent to the boundary line, the surface level of said land being the same as the level of the read-only area side of the boundary line. As a result, the boundary line between the rewritable area and read-only area will never contact a groove. It follows that recording marks in a groove in the rewritable area will not be mistakenly mixed with embossed marks in the read-only area.

The portions of the physical address area PID displaced approximately Pa/2 from the track of the rewritable area are being intruded into the start track land or the end track land. Thus, such deviated portions will not intrude into the read-only area. Thus, there will be no cross-talk between the data in the physical address area PID and the embossed marks of the read-only area.

In the second aspect of the invention, an optical disc of the first aspect further comprises an additional land of a predetermined width disposed between the start track land and the adjacent read-only area, and another additional land of a predetermined width disposed between the end track land and the adjacent read-only area.

By the second aspect of the invention, by inserting the additional land the cross-talk between the rewritable area and read-only area can be prevented. Also, since the additional land is provided it is not necessary to adjust the alignment between the track of the rewritable area and that of the read-only area. Furthermore, by detecting the additional land, it is possible to discriminate between the rewritable area and read-only area.

In the third aspect of the invention, an optical disc of the first aspect is arranged such that the rewritable area and read-only area are formed at least in the lead-in area at the center-side of the optical disc, said read-only area being a control data zone to which control data is prerecorded.

By the third aspect of the invention, the rewritable area and read-only area are formed at least in the lead-in area at the center of the optical disc. Thus, in the read-only area used as the control data zone, it is possible to add a control data which prohibits writing any data in the start track or end track land.

In the fourth aspect of the invention, the optical disc of the third aspect is arranged such that said control data includes data for prohibiting recording any data in said start track and end track lands.

By the fourth aspect of the invention, data read from the read-only area will not be mixed with data from the rewritable area, because absolutely no data is written to the start track or end track land.

In the fifth aspect of the invention, the optical disc of the first aspect is arranged such that the transition between the rewritable area and read-only area occurs approximately at a transition line.

By the fifth aspect of the invention, the leading edge of every track in the rewritable area and the read-only area are aligned along the transition line. Thus, and it is possible to easily seek the tracks and to manage the tracks. Also, it is possible to easily find location where the transition between the rewritable area and read-only area occurs.

In the sixth aspect of the invention, the optical disc of the first aspect is arranged such that the wavelength λ of the laser beam is 650 nm, the lens aperture NA is 0.6, and track pitch Pa and track pitch Pb are both 0.74 μm, and wherein a modulation method used is method modulating 8 data bits to 16 channel bits with the shortest recording mark being three channel bits and the longest recording mark being 11 channel bits.

By the sixth aspect of the invention, a compact, efficient data format that does not waste disc space is thus also achieved.

In the seventh aspect of the invention, an optical disc comprises:
- a rewritable area having a single spiral recording track formed by forming a groove and a land circumferentially on a disc substrate with the groove and land alternating and the recording track of a groove corresponding to one circumference of the disc and the recording track of the land corresponding to one circumference of the disc connecting alternately to each other at a particular radial transition line, and the track pitch Pa of the recording tracks is a value less than λ/NA, said rewritable area having a first data recording area for recording data by marks formed thereon by a local physical change effected in a recording film by a laser beam of wavelength λ using a lens of a specific aperture NA, and
- a read-only area having a second data recording area to which particular information is prerecorded by forming a series of pits on the optical disc to a spiral recording track of a track pitch Pb substantially equal to the track pitch Pa of the spiral recording track in the rewritable area,
- said rewritable area comprising recording sectors each of which comprises a first header area preformatted with embossed pits expressing an address information, and a first data recording area for recording data,
- said first header area comprising a physical address area PID comprising at least an address area Pid for storing sector address information, said physical address area PID being repeated 2K (K being a positive integer) times,
- wherein when the 2K physical address areas PID are labelled in sequence from the first $PID_1, \ldots, PID_K, PID_{K+1}, \ldots,$ and $PID_{2K}$, the first half $PID_1, \ldots, PID_K$ are deviated in a first radial direction of the disc approximately Pa/2 from the track of the groove recording sector, and the second half $PID_{K+1}, \ldots, PID_{2K}$ are deviated in a second radial direction of the disc approximately Pa/2 from the track of the groove recording sector, and
- said rewritable area being disposed adjacent to said read-only area with a land having a width approximately equal to a plurality of tracks being interposed therebetween.

In the eighth aspect of the invention, an optical disc comprises:
- a rewritable area having a single spiral recording track formed by forming a groove and a land circumferentially on a disc substrate with the groove and land alternating and the recording track of a groove corresponding to one circumference of the disc and the recording track of the land corresponding to one circumference of the disc connecting alternately to each other at a particular radial transition line, and the track pitch Pa of the recording tracks is a value less than λ/NA, said rewritable area having a first data recording area for recording data by marks formed thereon by a local physical change effected in a recording film by a laser beam of wavelength λ using a lens of a specific aperture NA, and
- a read-only area having a second data recording area to which particular information is prerecorded by forming a series of pits on the optical disc to a spiral recording track of a track pitch Pb substantially equal to the track pitch Pa of the spiral recording track in the rewritable area,
- wherein said transition between the rewritable area and read-only area occurs approximately at a transition line.

In the ninth aspect of the invention, an optical disc of the eighth aspect is arranged such that the groove pitch of the rewritable area is twice the pitch of the embossed marks of the read-only area.

By the ninth aspect of the invention, it is possible to record data to the rewritable area at substantially the same recording density used in the read-only area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
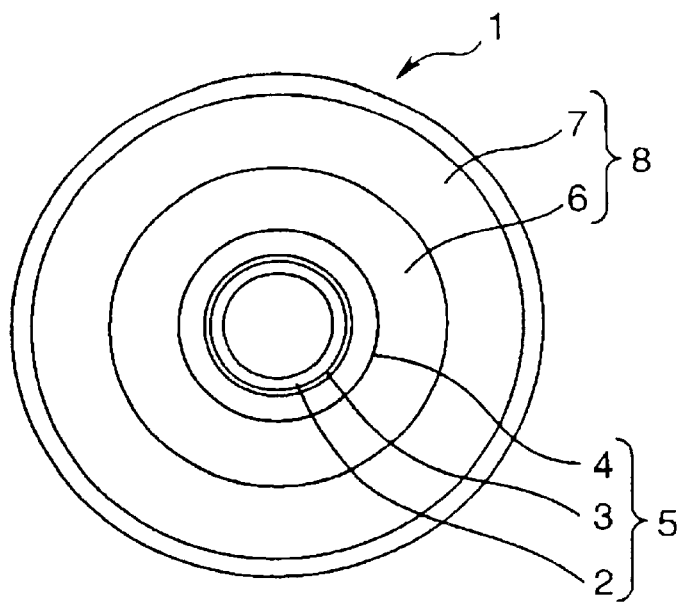
FIG. 1 is a plan view of an optical disc according to a first embodiment of the invention.

The preferred embodiments of the present invention are described below with reference to the accompanying figures.
First Embodiment FIG. 1 is a plan view of an optical disc 1 according to the present invention. This optical disc 1 comprises in sequence from the inside circumference side of the disc a rewritable area 2 that can be recorded or reproduced, a read-only area 3 that can only be reproduced, a rewritable area 4, read-only area 6, and rewritable area 7.

The lead-in area 5 at the inside circumference side of the disc comprises rewritable area 2, read-only area 3, and rewritable area 4. The rewritable areas 2 and 4 of the lead-in area 5 are used to test the recording characteristics of the optical disc, and the read-only area 3 is the area to which the characteristics and format of the optical disc 1 are recorded.

The data area 8 is on the outside circumference side of the lead-in area 5, and comprises read-only area 6 and rewritable area 7. Audio data and video data can-be written to the data area 8.

It will be obvious that the disc format shown in FIG. 1 is only one example of the rewritable and read-only area arrangements that can be used with optical disc 1. A spiral track is also disposed on optical disc 1 from the inside circumference to the outside circumference. Data is recordable to and reproducible from this spiral track in the rewritable area, and is reproducible from said track in the read-only area. It should be noted that the track pitch in the preferred embodiment of the invention is 0.74 $\mu$m.

Figure 2:
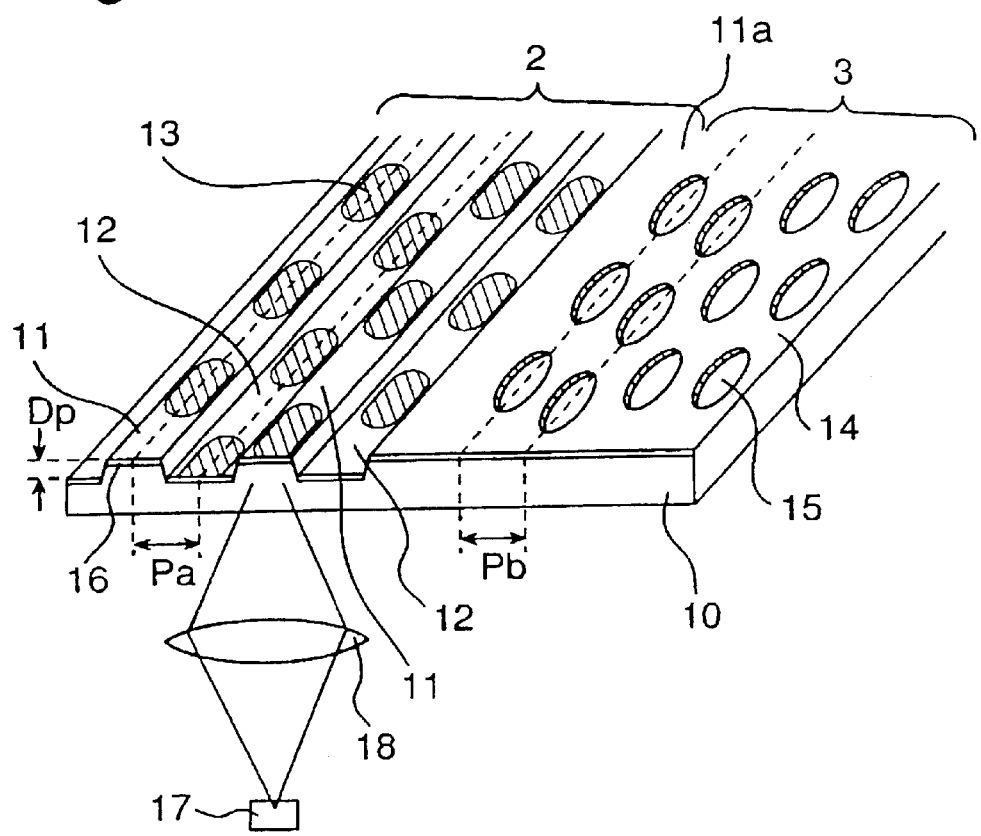
FIG. 2 is an enlarged oblique partial cross section of an optical disc according to a first embodiment of the invention.

FIG. 2 is a detailed view of the rewritable area 2 and read-only area 3, and the border area therebetween, formed on substrate 10 having a refractive index n. Note that rewritable area 2 comprises lands 11 extending in a pattern following the track and on the same level as the reference surface of the disc, and groove 12, which also extends in a pattern following the track and is recessed to a depth Dp below the reference surface. It should be noted that depth Dp in the preferred embodiment of the invention is 0.07 $\mu$m. The pitch Pa between land 11 and the adjacent groove 12, i.e., the distance between the center line of land 11 and the center line of groove 12, is 0.74 $\mu$m. This means that the pitch between lands 11, and between grooves 12, is twice the track pitch or 1.48 $\mu$m.

A phase-change recording film 16 is disposed to the surface of land 11 and groove 12. Binary recording is made possible by emitting a laser beam from light source 17 and focusing the laser beam using lens 18 with a specific aperture NA on recording film 16 to effect a physical change such as a local change in the refractive index at the area of incidence. This local area of incidence and physical change is called the "recording mark" 13 below. The recording mark 13 can be rewritten by again emitting a laser beam of controlled intensity to the same area.

The wavelength $\lambda$ of the laser beam is 650 nm and the aperture NA of the lens 18 is 0.6 in the preferred embodiment of the invention. The refractive index n of optical disc substrate 10 is preferably approximately 1.5. The pitch Pa is a value smaller than $\lambda$/NA.

The lands and grooves are thus arranged in an alternating pattern in the rewritable area to enable laser beam tracking.

As also shown in FIG. 2, read-only area 3 comprises land surface 14 on the same level as the disc reference surface, and plural embossed marks 15 in land surface 14 arranged in a pattern following the track. Note that these embossed marks 15 are, for example, pits. The embossed marks 15 are preformed on the optical disc 1, and the optical disc user therefore cannot erase or overwrite embossed marks 15. The pitch Pb between adjacent embossed marks 15 is 0.74 $\mu$m.

Figure 4:
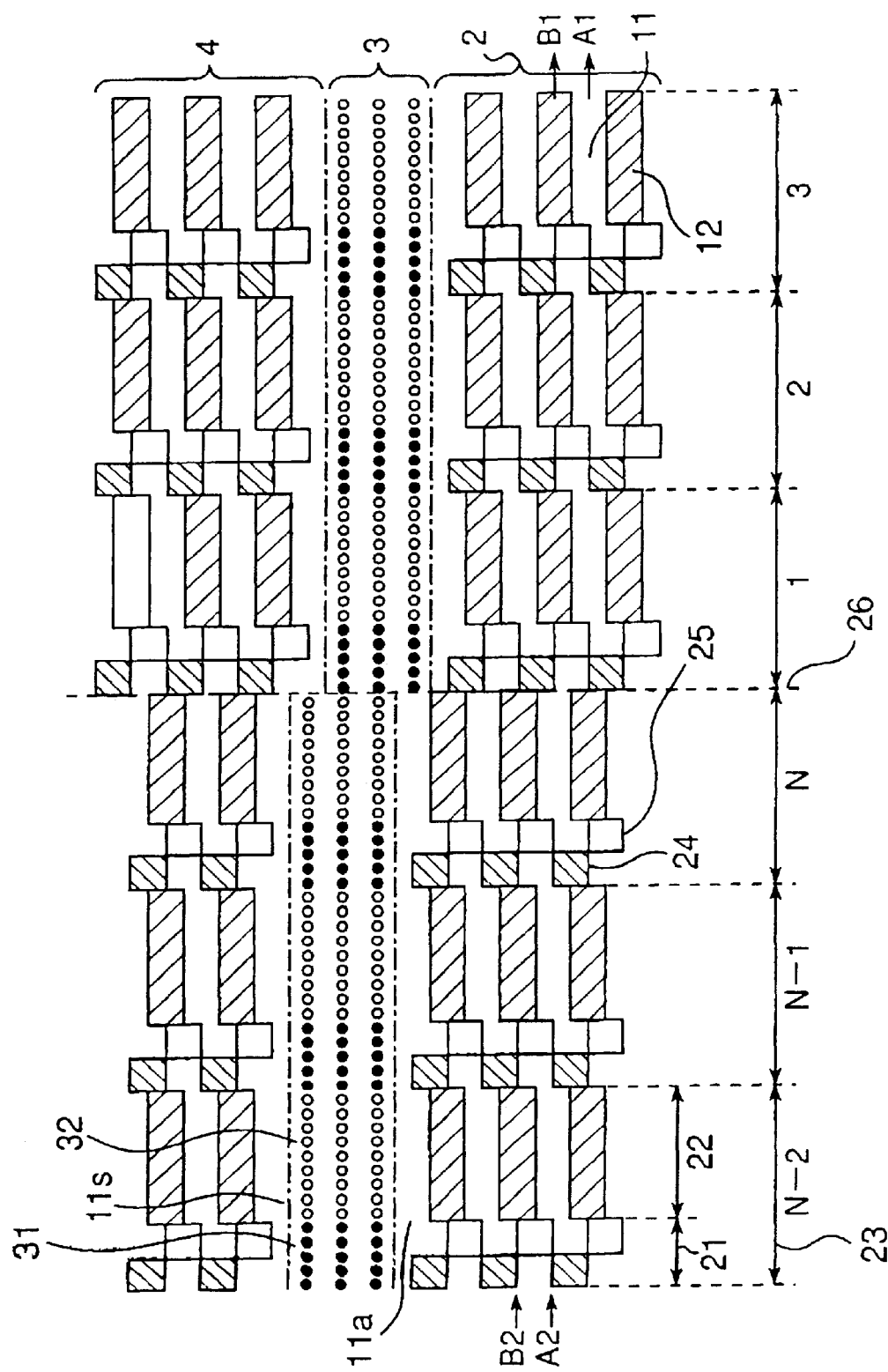
FIG. 4 is an enlarged plan view of the area around the transition line between the rewritable area and read-only area in an optical disc according to a first embodiment of the invention.

The very last track (end track) in the rewritable area 2 adjacent to read-only area 3 is always land 11 as shown in FIG. 2. Such a land is referred to as a end track land 11a. Recording data to this end track land 11a is prohibited. This prohibition of recording data to the end track land 11a is previously determined by a protocol of the disc version. The disc version is recorded to the read-only area 3 of the lead-in area 5. As shown in FIG. 4, the very first track (start track) of the rewritable area 4 adjacent to the read-only area 3 is also a land (referred to as a start track land 11s) to which data recording is also prohibited.

In other words, a rewritable area in an optical disc according to the present invention comprises grooves and lands alternating every circumference of the disc such that a rewritable track always begins with a groove and always ends with a groove. In addition, a start track land 11s is provided on the outside, which is the inside circumference side, of the first rewritable groove track in a rewritable area, and an end track land 11a is provided on the outside, which is the outside circumference side, of the last rewritable groove track of a rewritable area, and data recording to the start track land 11s and the end track land 11a is prohibited. The start track land 11s and end track land 11a are provided for capturing the header first half 24 or header second half 25, which are offset one-half track width from the groove tracks of the read-only area respectively adjacent to the start track land 11s and end track land 11a.

Figure 3:
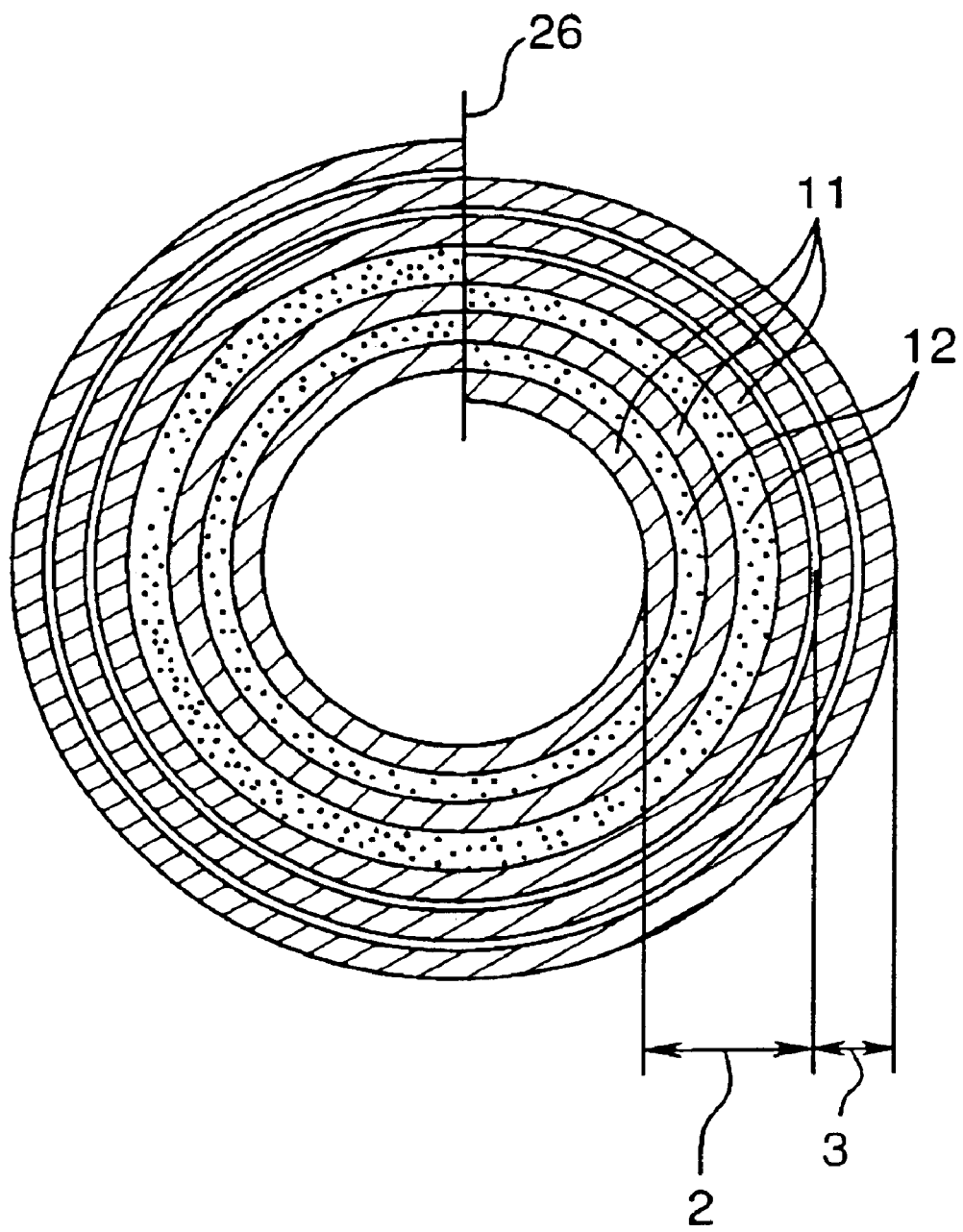
FIG. 3 is a plan view used to describe the track arrangement on an optical disc according to a first embodiment of the invention.

FIG. 3 is an enlarged plan view of the rewritable area 2 and read-only area 3. As shown in FIG. 3 a single spiral track is formed from the inside circumference to the outside circumference. Note that as described above the land 11 and groove 12 alternate in rewritable area 2. More specifically, land 11 starts at a given transition line 26 and continues once around the track to transition line 26 again. Groove 12 then starts and continues once around the track, similarly returning to transition line 26. The land 11 then starts again and makes another circuit around the track. Note that this transition line 26 is an imaginary line extending radially from the inside circumference and defining the transition between land 11 and groove 12. The transition from the end track land 11 and the beginning of the read-only area 3 following thereafter also occurs at this transition line 26. The transition between the rewritable area and the read-only area thus always occurs at transition line 26. Note that as described above a series of embossed marks 15 is formed on a spiral track in read-only area 3.

Thus, the leading edge of every track in the rewritable area and the read-only area are aligned along the transition line 26. Thus, and it is possible to easily seek the tracks and to manage the tracks. Also, it is possible to easily find the location where the transition between the rewritable area and read-only area occurs.

FIG. 4 is an enlarged plan view of the area of rewritable area 2, read-only area 3, and rewritable area 4 near the transition line 26. Starting at the transition line 26, each track is divided into N sectors 23 per revolution where N is a positive integer such as 17. In the rewritable area 2 each sector 23 comprises a header area 21 at the beginning of the sector followed by a data recording area 22 with a mirror area therebetween. As described in detail below, the read-only area 3 also comprises a header area 31 and data recording area 32. Note that whereas the header area 21 and data recording area 22 of the rewritable area 2 are referred to as the first header area and first data recording area, the header area 31 and data recording area 32 of the read-only area 3 are referred to as the second header area and second data recording area.

The first header area 21 is further divided into header first-half 24 and header second-half 25. The header first-half 24 is deviated, or disposed offset, approximately half the track pitch to one side of the center line of groove 12, or 0.37 μm from the center line using the preferred track pitch of the present embodiment as described above, and the header second-half 25 is deviated approximately half the track pitch to the other side of the center line of groove 12, or 0.37 μm from the center line using the preferred track pitch of the present embodiment as described above. The structure of the first header area 21 is described further in detail below.

Figure 5:
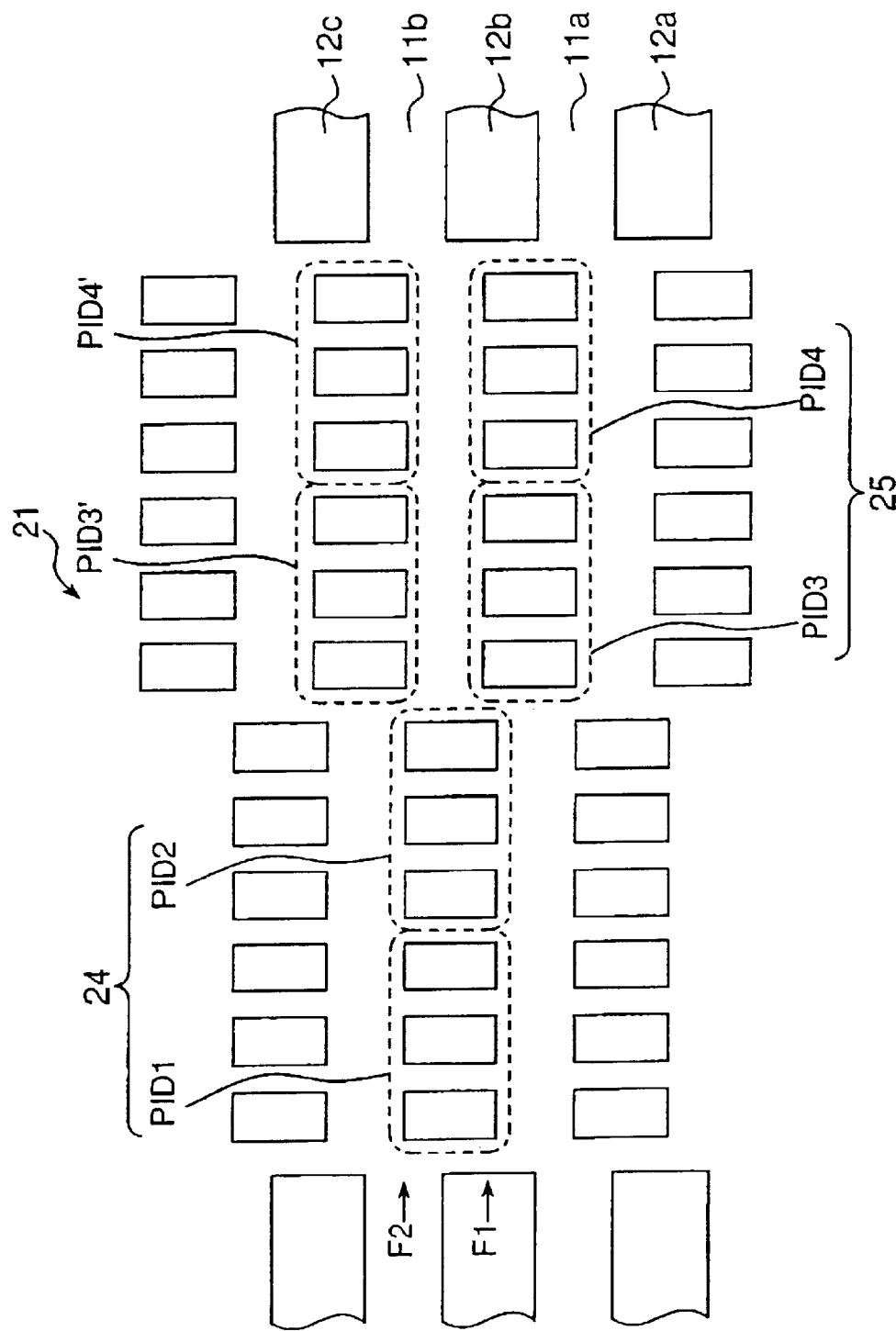
FIG. 5 is an enlarged view of the address area in the rewritable area of an optical disc according to the invention.

As shown in FIG. 5 the header first-half 24 comprises contiguously disposed first area PID 1 and second area PID 2, and the header second-half 25 likewise comprises contiguously disposed third area PID 3 and fourth area PID 4. First to fourth identification codes and the sector address are recorded respectively to the first to fourth areas. Note that the sector address is modulated using a runlength-limited modulation method in this embodiment.

Figure 6:
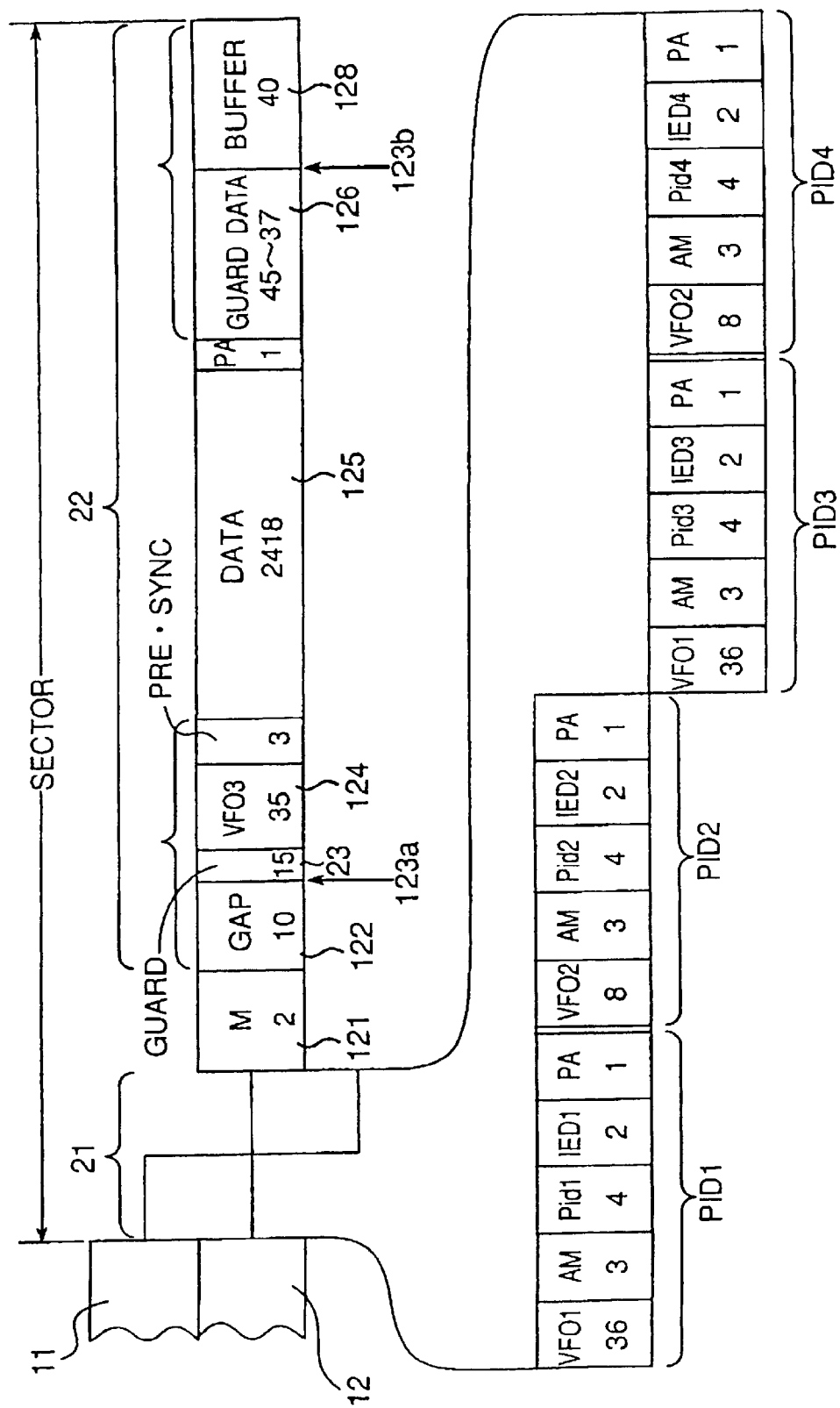
FIG. 6 is a detailed illustration of the data format of a sector of a rewritable area.

The specific data structure recorded to the rewritable area is shown in FIG. 6. The signal format of the first header area 21 is described first below. The first area PID 1 comprises single frequency pattern area VFO1 for generating the synchronization clock for reproduction and determining the detection timing; address mark area AM for byte synchronization during header reproduction and recognizing the start of the detection timing; address area Pid1 for storing the sector address information; address error detection area IED1 for storing code for detecting errors in the address area; and postamble area PA for completing modulation.

The second area PID 2 likewise comprises single frequency pattern area VFO2, address mark area AM, address area Pid2, address error detection area IED2, and postamble area PA.

The third area PID 3 also comprises single frequency pattern area VFO1, address mark area AM, address area Pid3, address error detection area IED3, and postamble area PA.

The fourth area PID 4 also comprises single frequency pattern area VFO2, address mark area AM, address area Pid4, address error detection area IED4, and postamble area PA.

A modulation method mapping 8 data bits to 16 channel bits is used. The shortest recording mark is thus three channel bits and the longest recording mark is 11 channel bits.

The single frequency pattern areas VFO are recorded with a particular repeated bit pattern, e.g., 00010001, and are used for synchronization to the reproduction clock produced by the oscillation circuit (in the PLL circuit 152 shown in FIG. 8) of the reproduction circuit during the period of the single frequency pattern area VFO1. The length of the single frequency pattern area VFO1 is the length needed to contain the edges of the number of recording marks needed for synchronization, and is preferably 36 bytes.

The same particular pattern is repeatedly recorded to single frequency pattern area VFO2, the length of which is similarly sufficient to contain the edges of the number of recording marks needed for re-synchronization to the reproduction clock within pattern area VFO2. The single frequency pattern area VFO2 is thus preferably 8 bytes long.

The address mark area AM is long enough to contain a channel bit pattern of recording marks of a length that does not appear in the modulated bit series and is longer than the longest recording mark of the modulation method. The address mark area AM is preferably 3 bytes long in this embodiment.

The address areas Pid1, Pid2, Pid3, and Pid4 record the recording sector address, and are preferably 4 bytes long.

The address error detection areas IED1, IED2, IED3, and IED4 are a length enabling reproduction errors in the address area Pid to be detected with a known maximum error detection rate, and are preferably 2 bytes.

The postamble area PA is a length greater than the maximum length required by the modulation method and enabling the recording marks to be completed. Each postamble area PA is preferably 1 byte.

As shown in FIG. 6 a mirror area 121 follows the first header area 21. This mirror area 121 is a flat surface area in which no grooves or embossed marks are formed, and is used, for example, for correcting tracking deviations. The format of the first data recording area 22 following this mirror area 121 is described in detail below.

The first data recording area 22 comprises a gap area 122, first guard data area, a single frequency pattern area VFO3 124, a pre-synchronization area, a data area 125, postamble area, guard data area 126, and buffer area 128. The gap area 122, first guard data area, single frequency pattern area VFO3 124, and pre-synchronization area together constitute a first buffer area, and the guard data area 126 and buffer area 128 together constitute a second buffer area.

No signal data is written to the gap area 122, which is used for laser power adjustment.

First and second guard data areas 126 are disposed before and after the recorded data to compensate for media deterioration from repeated recording and reproduction.

Optical disc recording media tend to deteriorate with repeated recording of the same data to the same place. To compensate for this the length of the guard data area 126 before and/or after the data area is adjusted to shift the recording position of the data in the data area. Note that the length of each guard data area is adjusted so that the total length of the first and second guard data areas remains constant.

The single frequency pattern area VFO3 124 is an area to which a particular pattern, e.g., a contiguously repeated pattern of a particular pulse width of the modulation code, is recorded for setting the oscillation frequency of the oscillation circuit (in the PLL 152 shown in FIG. 8) of the reproduction circuit.

The pre-synchronization area stores a code pattern with a high auto-correlation as a synchronization signal for detecting the beginning of the data area.

The data area 125 is the area to which user data, including error correction code, is recorded by the user. Note that the data area 125 is erasable and rewritable.

The postamble area PA is a length greater than the maximum length required by the modulation method and enabling the recording marks to be completed. The postamble area PA is preferably 1 byte.

The buffer area 128 is an area to which nothing is recorded, i.e., is blank. The buffer area 128 is used to absorb timing offsets occurring as a result of -rotational jitter of optical disc 1 so that the end 123b of the recorded data does not overlap the next header area.

In the preferred embodiment of the invention the capacity of the mirror area 121 is 2 bytes, the gap area 122 is 10 bytes, the single frequency pattern area VFO3 124 is 35 bytes, the data area 125 is 2418 bytes, the postamble area PA is 1 byte, and the buffer area 128 is 40 bytes. The total combined size of the first and second guard data areas is a constant 60 bytes with 19±4 bytes allocated to the first guard data area and 41±4 bytes allocated to the second guard data area.

It should be noted that the lengths of the first and second guard data areas are preferably adjusted in the present embodiment of the invention to shift the position of the data area as described above, but the invention shall not be so limited. It is also possible to achieve the same effect by, for example, adjusting the length of the gap area and buffer area.

The signal format of the header area 31 of the read-only area, i.e., the second header area as described above, is shown in FIG. 7 and described below. This second header area 31 has the same data arrangement and data capacity as the first header area 21, and is written with data modulated by the same modulation method.

More specifically, a 2-byte mirror area 130 follows the second header area 31, and is followed by the second data recording area 32. The format of this second data recording area 32 is described in detail below.

The data area 131 is pre-recorded with particular information using an embossed pit sequence. As a result, this data area 131 is a read-only area.

The postamble area PA is a length greater than the maximum length required by the modulation method and enabling the recording marks to be completed. The postamble area PA is preferably 1 byte.

The entire second data recording area 32 is recorded when the disc is manufactured by forming an embossed pit sequence. Note that this contrasts with the first data recording area 22, which is recordable and erasable multiple times by the user. As a result, the recording condition of the second data recording area 32 is more stable than the recording condition of the first data recording area 22. This eliminates the need in the second data recording area 32 for the gap area 122, guard data areas 126, and buffer area 128 of the first data recording area 22.

Therefore, to make the second data recording area 32 the same length as the first data recording area 22, and to make the data area 131 of the second data recording area 32 the same length as the data area 125 of the first data recording area 22, a first dummy data block is inserted to the second data recording area 32 at a position corresponding to the first buffer area and a second dummy data block is inserted at a position corresponding to the second buffer area of the first data recording area 22.

Figure 7:
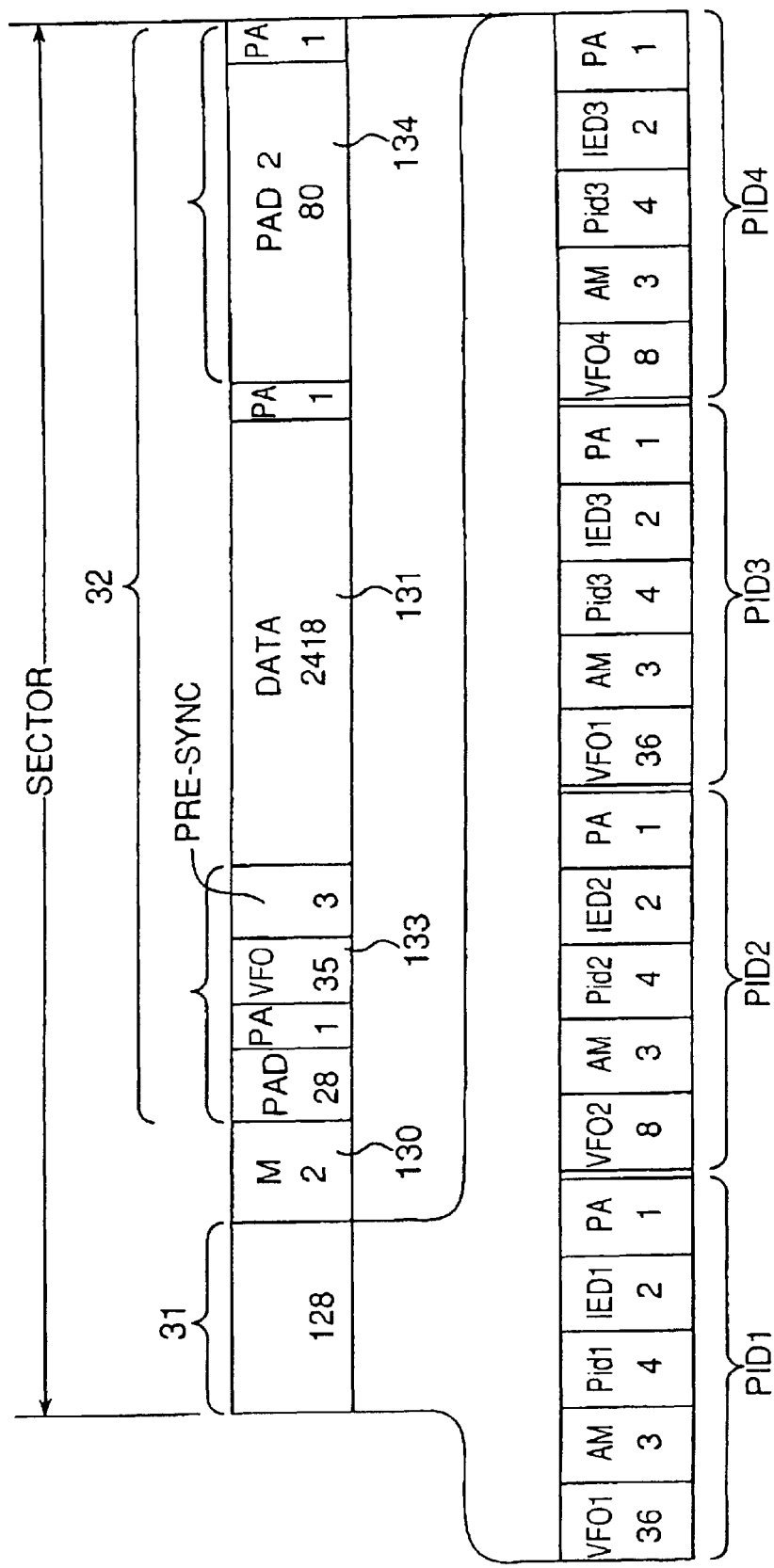
FIG. 7 is a detailed illustration of the data format of a sector of a read-only area according to a first embodiment of the invention.

In the data format shown in FIG. 7 a 28-byte first padding area and a 1-byte postamble area PA are added as the first dummy area. Note that this padding area and postamble area correspond to the gap area and first guard data area of the first data recording area 22. Note that as described above the length of the guard data area is adjustable, and the position of this first dummy area is therefore adjusted to the lengthwise center of the variable guard data area range. The postamble area is a length (1 byte) at least as long as the length required by the modulation method, and records a pattern enabling the recorded code and recorded marks to be completed: The same patterns recorded to the single frequency pattern area VFO (35 bytes) and pre-synchronization area (3 bytes) of the first guard data area are recorded to the single frequency pattern area VFO (35 bytes) and pre-synchronization area (3 bytes) of the first dummy area.

An 80-byte second padding area and another 1-byte postamble area are added following the postamble area PA of the data area 131 to form a second dummy area in the second data recording area 32. This second padding area and postamble area correspond to the second guard data area and buffer area of the first data recording area 22. As with the first dummy area, the position of this second dummy area is adjusted to the lengthwise center of the corresponding variable guard data area range. This postamble area is also a length (1 byte) at least as long as the length required by the modulation method, and records a pattern enabling the recorded code and recorded marks to be completed.

A particular predetermined pattern is recorded to the first padding area and the second padding area. This pattern can be, for example, a single frequency pattern that repeatedly inverts at a constant period similarly to the pattern recorded to the single frequency pattern area VFO, or a particular pattern determined by data.

Referring again to FIG. 4, the read spot of the laser beam can be thought of as travelling over the land track indicated by arrow A1. When the laser spot travels nearly one full revolution of the disc, it has advanced to the position indicated by arrow A2, and then reaches the transition line 26. When the laser spot crosses the transition line 26 it traces the groove track in the direction of arrow B1. When the laser spot makes another revolution of the disc, it has advanced to arrow B2, and then again reaches the transition line 26. The laser spot thus alternately traces the land tracks and groove tracks with each revolution of the disc in the rewritable area 2, which is configured as described above so that the end track of the rewritable area 2 is land 11. When the end of land 11 is reached, the laser spot enters read-only area 3 at the transition line 26. Note, further, that there are no recording marks in the end track of rewritable area 2.

The start track of rewritable area 4 at the transition from read-only area 3 to rewritable area 4 is also a land 11, and writing data to this land 11 is also prohibited.

Figure 8:
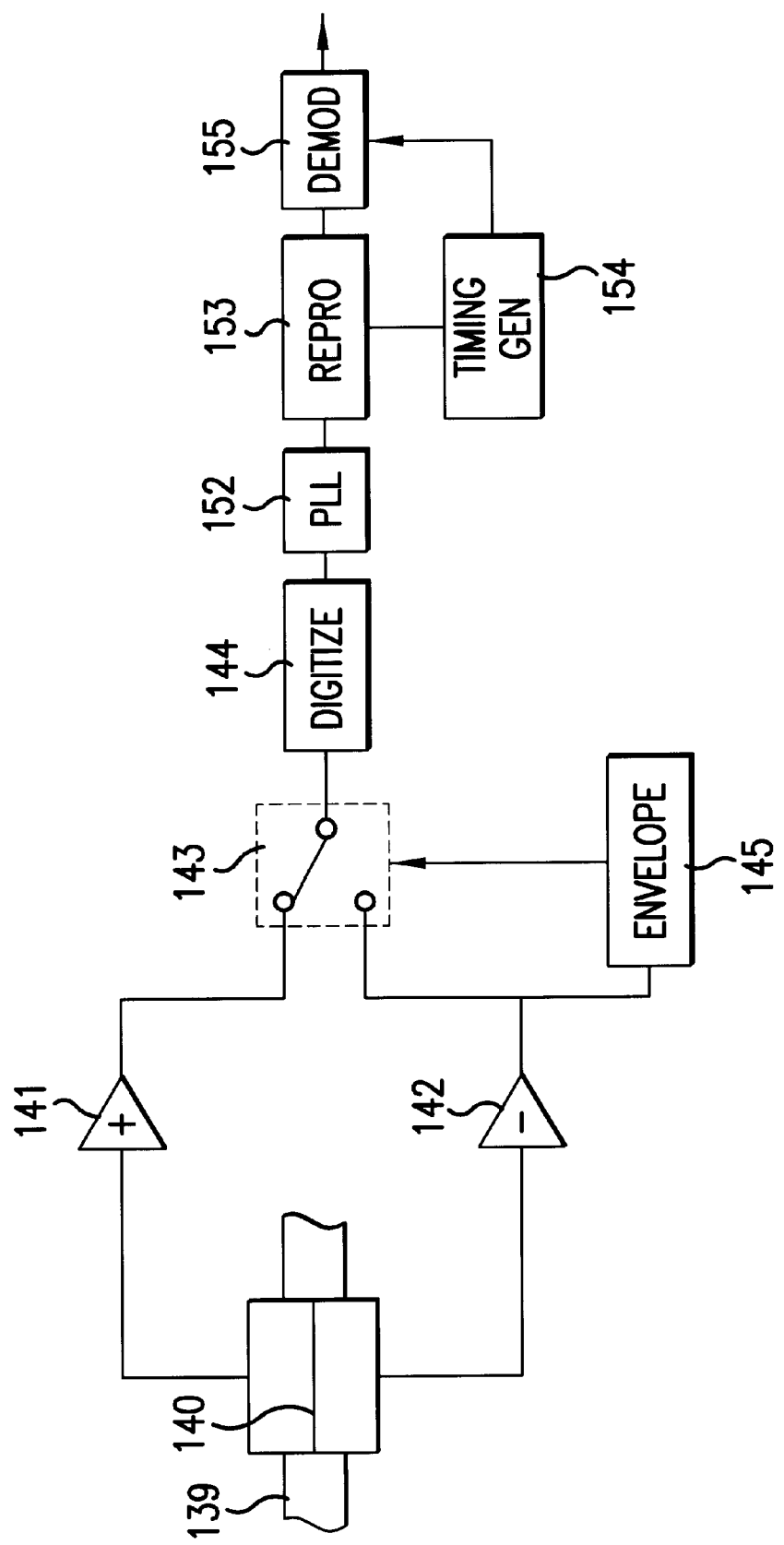
FIG. 8 is a block diagram of a reproduction circuit for an optical disc according to a first embodiment of the present invention.

FIG. 8 is a simple block diagram of an optical disc reproduction apparatus for reproducing an optical disc to which the signal formats shown in FIG. 6 and FIG. 7 are written. Referring to FIG. 8, the track 139 is either a groove 12 or a land 11 track on an optical disc 1 according to the present invention. Light reflected from the track is detected by a split photodetector 140 for converting to a reproduction signal the light reflected from the embossed pits of the read-only area or the recording marks of the rewritable area. The sum signal of the split photodetector 140 output is output by operating amplifier 141, and the difference signal is output by operating amplifier 142. The selector switch 143 selectively passes the sum signal and the difference signal to the digitizing circuit 144.

The difference signal is detected by the envelope detector 145, which causes the selector switch 143 to switch to difference signal output when the difference signal rises to a particular threshold value. Note that the difference signal rises to this threshold only in the first header area 21 of the rewritable area in the signal format shown in FIG. 4, and selector switch 143 therefore only outputs the difference signal when the first header area 21 is reproduced. The difference signal is below this threshold value in the first data recording area 22 of the rewritable area and throughout the read-only area, and the selector switch 143 therefore outputs the sum signal during reproduction from these areas.

The digitizing circuit 144 operates at the threshold value set according to the sum and difference signals to digitize the reproduction signal. The PLL 152 then extracts the reproduction clock from the digitized signal, and supplies the clock to the PID reproduction circuit 153 reproducing the header areas. A timing signal generator 154 generates the gate signal used for user data reading, and the digital signal is then demodulated to binary data by a demodulator 155.

Second Embodiment

Figure 9:
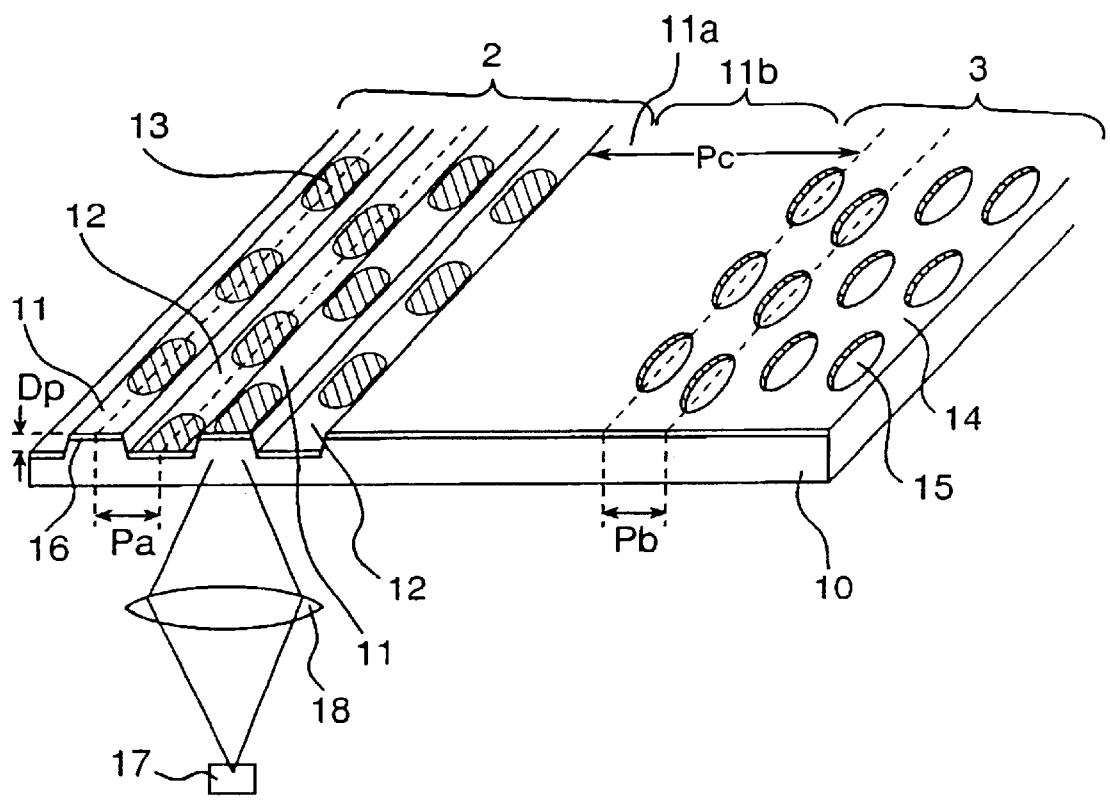
FIG. 9 is an enlarged oblique partial cross section of an optical disc according to a second embodiment of the invention.
Figure 10:
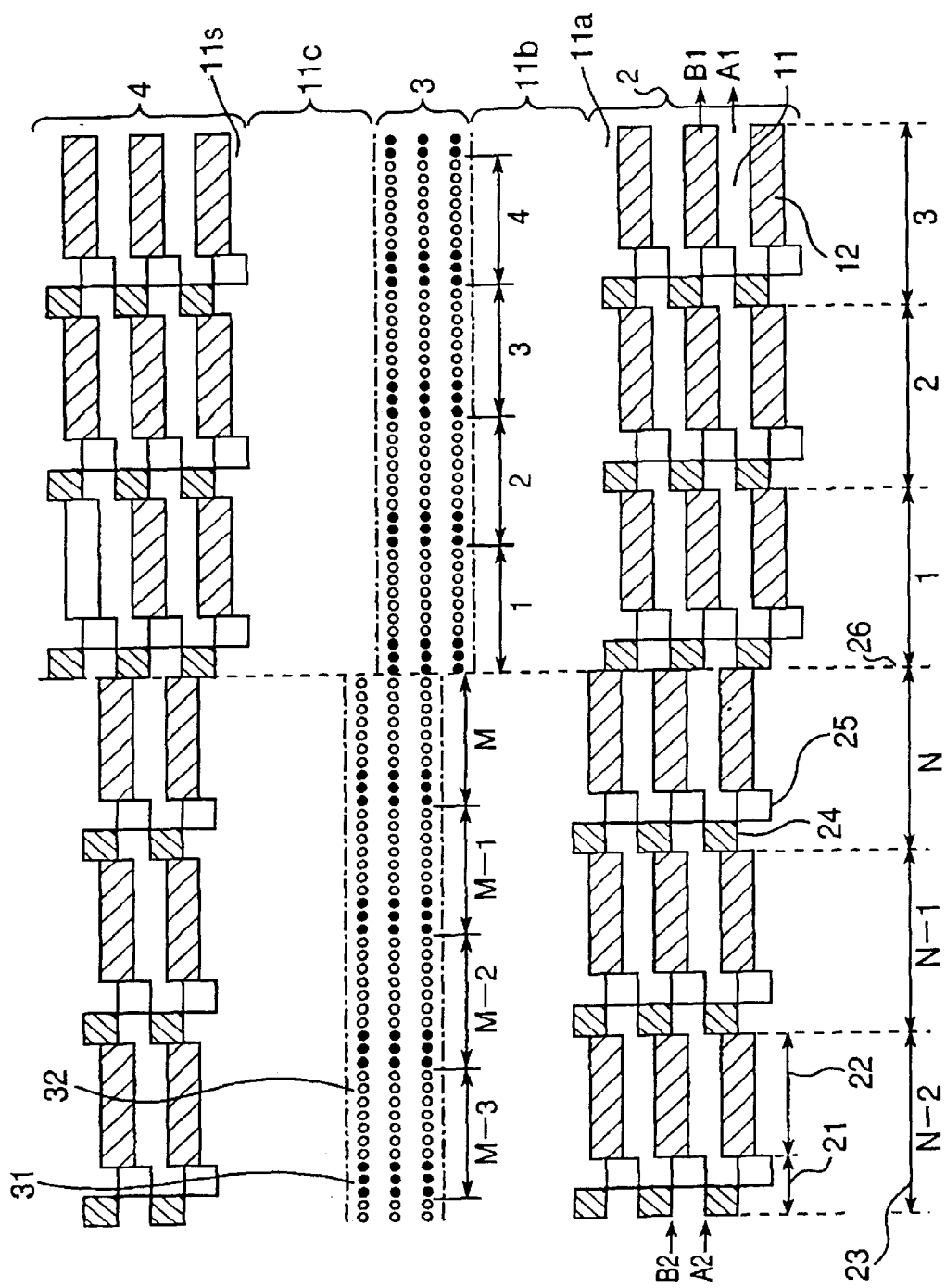
FIG. 10 is an enlarged plan view of the area around the transition line between the rewritable area and read-only area in an optical disc according to a second embodiment of the invention.

A second embodiment of an optical disc comprising a rewritable area and a read-only area according to the present invention is shown in FIG. 9 and FIG. 10. The optical disc according to the second embodiment differs from that of the first embodiment in disposing an additional lands 11b and 11c adjacent to the end track land 11a and the start track land 11s, and changing the format of data in the read-only area.

The additional lands are described first below. Noted first that recording data of any kind to additional lands 11b and 11c is prohibited. This data recording prohibition is accomplished by recording information declaring that such recording is prohibited to the read-only area 3 of the lead-in area 5.

In the example shown in FIG. 9 the width Pc of additional lands 11b and 11c is 3.26 μm by way of example only. It should be noted, however, that this width Pc shall not be so limited, and can be appropriately selected. In the preferred embodiment of the invention width Pc is selected in the range 0.68 μm–5.42 μm, inclusive. Note, further, that end track land 11a and additional land 11b are together referred to as a "connection zone," and start track land 11s and additional land 11c are likewise referred to as a connection zone. The connection zones are high reflectivity mirror areas.

Providing additional lands 11b and 11c simplifies adjustment of the cutting machine during disc manufacture. In general, a cutting machine uses a first laser to create the groove and address of the rewritable area, and uses a second laser to create the embossed marks of the read-only area during disc manufacture. If additional lands 11b and 11c are not provided as with the optical disc shown in FIG. 2 and FIG. 4, it is necessary to switch from the first laser to the second laser within a single disc revolution at the end track land 11a, and to maintain precise alignment of the track formed in the rewritable area using the first laser and the track formed in the read-only area using the second laser. High precision is therefore required in positioning the beam spots of the first and second lasers, and this adjustment is difficult. Providing additional lands, however, affords additional time for the change from the first laser to the second laser, and eliminates the need to maintain precise alignment between the track formed in the rewritable area using the first laser and the track formed in the read-only area using the second laser. Note, further, that it is not necessary to maintain precise track alignment in the rewritable and read-only areas because movement between the rewritable area and read-only area is accomplished with a seek operation during reproduction. More specifically, tracking control is not applied in the connection none.

It should also be noted that the width of the additional lands 11b and 11c is up to about ten times the track pitch, and the entire area of the additional lands 11b and 11c is a mirror area. It is therefore easy to detect the additional lands during the seek operation. Because the additional lands are disposed between each rewritable area and read-only area, it is known that each time the optical head crosses the additional lands there is a transition between rewritable area and read-only area. Therefore, if the first area disposed on the inside circumference side of the disc is a rewritable area, for example, it can be easily detected whether the optical head is currently positioned to a rewritable area or a read-only area once an additional land is detected.

The detection signal from the additional lands can in particular be used as a tracking control switching signal because push-pull tracking control is used in the rewritable area and phase difference tracking control is used in the read-only area.

It should be further noted that crosstalk between signals from the rewritable area 2 and read-only area 3 can be avoided by providing additional lands 11b and 11c.

The data format of the read-only area is described next below.

As shown in FIG. 10, there are M sectors 23' in the read-only area 3 and N sectors 23 in the rewritable area where M is greater than N and the difference between M and N depends upon the radial distance from the disc center.

Figure 11:
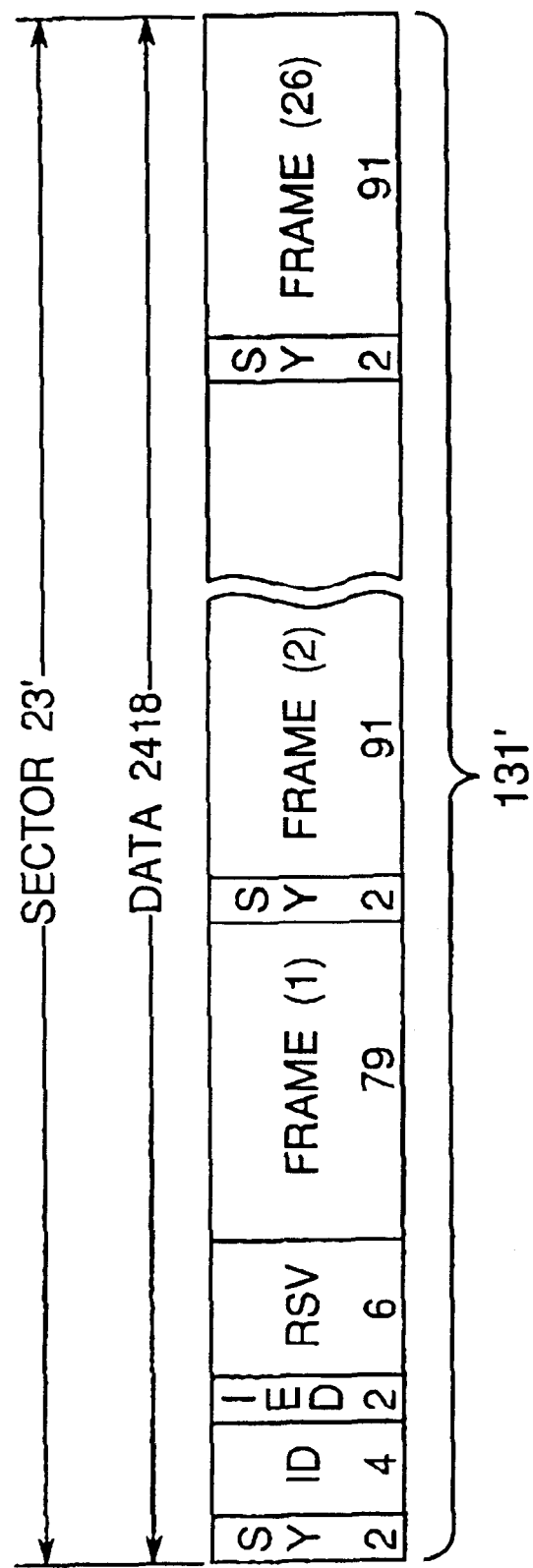
FIG. 11 is a detailed illustration of the data format of a sector of a read-only area according to a second embodiment of the invention.

FIG. 11 is a format diagram of the read-only area sectors 23' shown in FIG. 10.

Each sector 23', containing 2418 bytes, has the same format as the data area 131 of sector 23 in the rewritable area of the first embodiment. The 2418 bytes comprises 2048 bytes of user data, and error correction codes. Furthermore, each sector has a number of frames, each frame is 91 byte long and 2 byte sync code being added. One sector includes 26 frames. In the first frame of the sector, 4-byte address code (ID) representing the logical address of the sector is provided. The ID is then followed by a 2-byte address code (ID) error detection code (IED), which is then followed by a 6-byte reserved zone (RSV) for recording various other information of that sector.

It will be noted that the read-only area sectors of the second embodiment shown in FIG. 11 differ from the read-only area sectors of the first embodiment shown in FIG. 7 in the elimination of the first and second dummy areas, simplification of the structure of the header area 31, and is retention of the same format in the data area 131. It will therefore be obvious that the density of the user data area is greater in the read-only area of the optical disc shown in FIG. 11 than in the optical disc shown in FIG. 7. In addition, the format of the data area 131' of the read-only area in FIG. 11 is identical to that of the data area 125 of the rewritable area.

Figure 12:
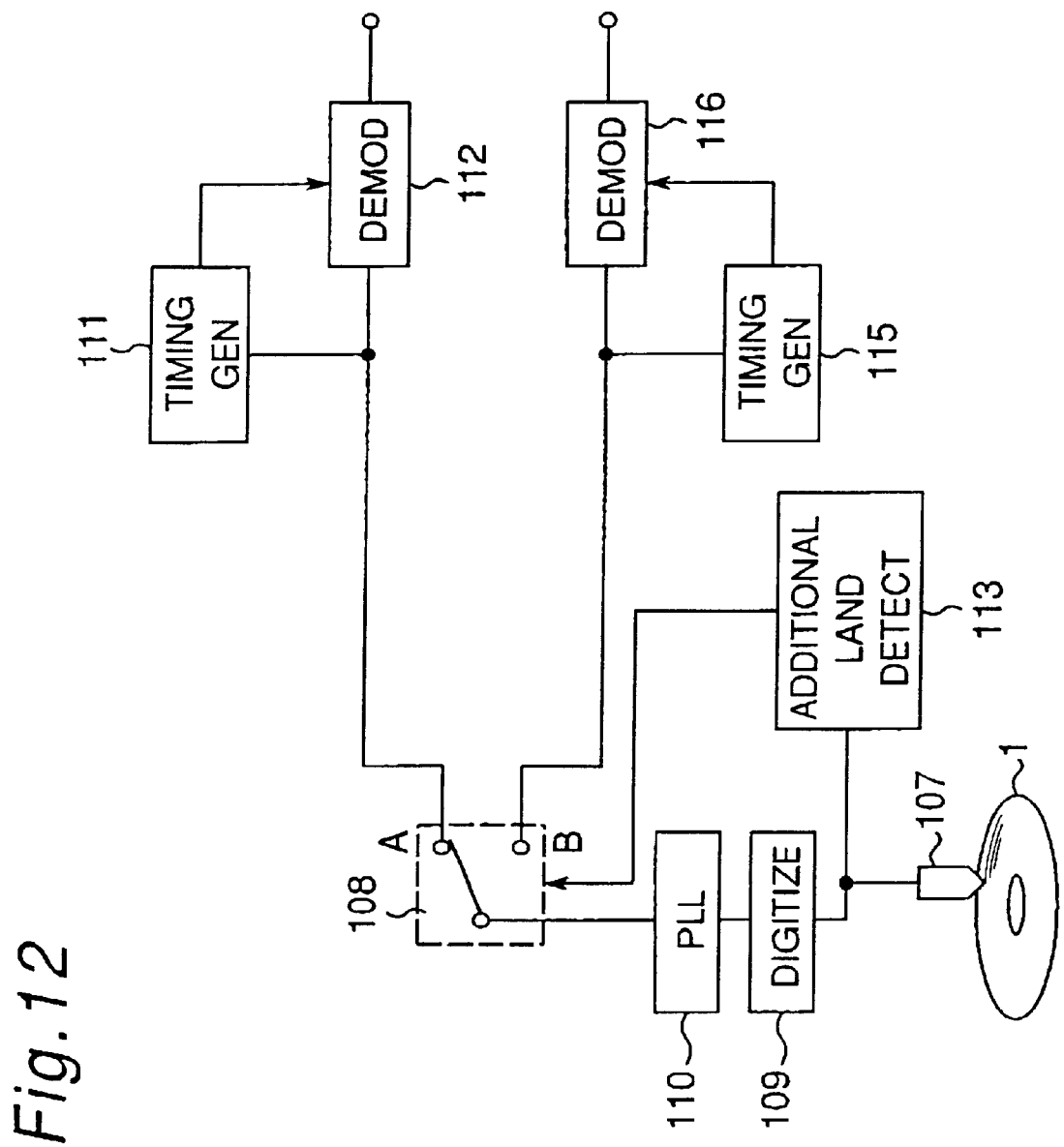
FIG. 12 is a block diagram of a reproduction circuit for an optical disc according to a second embodiment of the present invention.

FIG. 12 is a simple block diagram of the reproduction signal processing circuit for reproducing the optical disc shown in FIG. 9 and FIG. 10. As shown in FIG. 12, the tracks on optical disc 1 are scanned by optical head 107. The data thus detected by optical head 107 is then digitized by digitizing circuit 109, the reproduction clock is extracted by a PLL circuit, and the clock is then applied to a switch 108. The data detected by the optical head is also applied to the additional land detector 113, which causes switch 108 to switch output between terminals A and B each time additional lands are detected. Terminal A is connected to timing generator 111 and demodulator 112 whereby data from a rewritable area is processed, and terminal B is connected to timing generator 115 and demodulator 116 whereby data from a read-only area is processed.

As described above, the first full track revolution on the inside circumference side of a rewritable area is defined as a start track land, and the last full track revolution on the outside circumference side of a rewritable area is defined as a end track land in an optical disc according to the second embodiment of the invention. It is therefore possible to capture either the header first half 24 or the header second half 25 offset one-half track width from a groove track in the rewritable area adjacent to start track land 11s and end track land 11a. As a result, there is no crosstalk between data in the offset header part and data in the adjacent rewritable area.

Also, it is possible to detect easily between the rewritable area and read-only area.

According to the present invention, the first header area can be reproduced in the rewritable area whether tracking a groove track or a land track with an optical disc and signal format according to the present invention. It is therefore not necessary to provide a separate header area for the groove and the land tracks of the rewritable area in an optical disc according to the present invention.

It is also possible to assure that sector management in the rewritable area is compatible with sector management in the read-only area by employing the same data format of the data area (2418 byte area) between the rewritable area and the read-only area. Thus, the reproduction circuit may have common circuits, such as digitizing circuit and PLL circuit for the data from the rewritable area and read-only area.

The first header area and second header area are furthermore formatted using the same data sequence and capacity with the data modulated using the same modulation code, and the data format of the first data recording area also has the same data capacity as the data format of the second data recording area with the data modulated using the same modulation code in an optical disc comprising both a rewritable area and a read-only area according to the present invention. It is therefore possible to use a single reproduction circuit to reproduce signals from both the rewritable area and the read-only area. It is therefore not necessary to provide two reproduction signal processing circuits, one for the rewritable area and one for the read-only area. The required circuit scale is thus reduced compared with a conventional optical disc reproduction apparatus. As a result, a high reliability reproduction signal processing circuit can be achieved with a simple circuit configuration when an optical disc according to the present invention is used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc comprising:
   a rewritable area having a single spiral data rewritable track of pitch Pa consisting of lands and grooves that alternate at a particular radial transition line; and
   a read-only area formed of a plurality of revolutions of said disc that are each divided into a plurality of sectors, said read-only area storing information that is prerecorded in the form of a series of marks in a spiral track of pitch Pb;
   wherein a transition between the rewritable area and the read-only area occurs approximately at said particular radial transition line.

2. An optical disc according to claim 1, wherein said rewritable area comprising recording sectors, each of which comprises a first header area preformatted with marks expressing address information, and a data recording area;
   each said first header area comprising 2K physical address areas $PID_i$, each physical address area $PID_i$ comprising at least an address area $Pid_i$ for storing sector address information,
   wherein physical address areas $PID_1$ to $PID_k$ are provided approximately Pa/2 from a groove recording track in a first radial direction and physical address areas $PID_{k+1}$ to $PID_{2k}$ are provided approximately Pa/2 from the groove recording track in a second radial direction; and
   wherein the data rewritable track of the rewritable area closest to the read-only area is a groove, and there is a land region between the closest data rewritable track of the rewritable area and the read-only area.

3. An optical disc according to claim 2, wherein the land region comprises a land track.

4. An optical disc according to claim 1, wherein the rewritable area and the read-only area are provided in an inner region of the disc, the read-only area being a control data zone to which control data is prerecorded.

5. An optical disc according to claim 3, wherein said land track closest to the read-only area is prohibited from being recorded with any data.

6. An optical disc according to claim 1 wherein Pa=Pb= 0.74 $\mu$m.

7. An optical disc according to claim 1 further comprising a second read-only area, the rewritable area being arranged between said first and second read-only areas, wherein the data rewritable track of the rewritable area closest to each read-only area is a groove.

8. An optical disc comprising a rewritable area having a single spiral recording track of pitch Pa consisting of lands and grooves that alternate at a particular radial transition line; and
   a read-only area to which information is prerecorded in the form of a series of marks in a spiral track of pitch Pb;
   said rewritable area comprising recording sectors, each of which comprises a first header area preformatted with marks expressing address information, and a data recording area;
   each said first header area comprising 2K physical address areas $PID_i$ each physical address area $PID_i$ comprising at least an address area $Pid_i$ for storing sector address information,
   wherein physical address areas $PID_1$ and $PID_k$ are provided approximately Pa/2 from a groove recording track in a first radial direction and physical address areas $PID_{k+1}$ to $PID_{2k}$ are provided approximately Pa/2 from the groove recording track in a second radial direction; and a land of width approximately equal to one or more tracks being provided between the closest data rewritable track of the rewritable area and the read-only area, respectively.

9. An optical disc according to claim 1, wherein Pb is approximately equal to Pa.

10. An optical disc according to claim 8, wherein Pb is approximately equal to Pa.

* * * * *

UNITED STATES PATENT AND TRADEMARK OFFICE
CERTIFICATE OF CORRECTION

PATENT NO. : 6,396,798 B1
DATED : May 28, 2002
INVENTOR(S) : Yoshinari Takemura et al.

It is certified that error appears in the above-identified patent and that said Letters Patent is hereby corrected as shown below:

Column 1,
Line 16, please change "area" to -- areas --

Column 2,
Line 15, please change "a end track" to -- an end track --
Line 52, please delete "a" before "control"

Column 3,
Line 1, please delete "and" after "Thus"

Column 5,
Line 26, please change "can-be" to -- can be --

Column 6,
Line 11, please change "a end track" to -- an end track --
Line 57, please delete "and" after "Thus"

Column 8,
Line 64, please change "-rotational" to -- rotational --

Column 11,
Line 6, please delete "an" before "additional"
Line 9, please change "Noted" to -- Note --
Line 50, please change "none" to -- zone --
Line 58, please add -- the -- before "rewritable"
Line 58, please add -- the -- after "and"

Column 12,
Line 16, please change "byte" to -- bytes --
Line 17, please insert -- a -- before "2 byte"
Line 17, please change "2 byte" to -- 2-byte --

UNITED STATES PATENT AND TRADEMARK OFFICE
CERTIFICATE OF CORRECTION

PATENT NO. : 6,396,798 B1
DATED : May 28, 2002
INVENTOR(S) : Yoshinari Takemura et al.

It is certified that error appears in the above-identified patent and that said Letters Patent is hereby corrected as shown below:

<u>Column 12, cont'd</u>
Line 18, please insert -- a -- before "4-byte"
Line 28, please delete "is" after "and"
Line 55, please change "a end track" to -- an end track --

Signed and Sealed this

Nineteenth Day of August, 2003

JAMES E. ROGAN
*Director of the United States Patent and Trademark Office*